United States Patent
Nakazato et al.

(10) Patent No.: US 8,263,258 B2
(45) Date of Patent: Sep. 11, 2012

(54) ELECTRIC STORAGE DEVICE

(75) Inventors: Kunio Nakazato, Tokyo (JP); Mitsuru Nagai, Tokyo (JP); Nobuo Ando, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 820 days.

(21) Appl. No.: 12/363,902

(22) Filed: Feb. 2, 2009

(65) Prior Publication Data

US 2009/0197171 A1 Aug. 6, 2009

(30) Foreign Application Priority Data

Feb. 6, 2008 (JP) .................. 2008-025820

(51) Int. Cl.
  *H01M 2/26* (2006.01)
  *H01M 2/28* (2006.01)
  *H01M 4/00* (2006.01)
  *H01M 4/02* (2006.01)
  *H01M 4/13* (2006.01)
  *H01G 9/00* (2006.01)

(52) U.S. Cl. ........ 429/209; 429/128; 429/161; 429/211; 361/502

(58) Field of Classification Search .................. 429/209, 429/211, 122, 128, 161; 361/502
See application file for complete search history.

(56) References Cited

U.S. PATENT DOCUMENTS 6,168,885 B1 * 1/2001 Narang et al. ................ 429/214
2009/0174986 A1 * 7/2009 Matsui et al. ................. 361/505

FOREIGN PATENT DOCUMENTS

| JP | 2006-286919 A | 10/2006 |
| JP | 2007-173615 A | 7/2007 |
| WO | WO 2006/112070 A1 * | 11/2006 |

\* cited by examiner

*Primary Examiner* — Eugenia Wang

(74) *Attorney, Agent, or Firm* — McDermott Will & Emery LLP

(57) ABSTRACT

An electric storage device 10 has an electrode laminate unit 12 including positive electrodes 14, negative electrodes 15 and a lithium electrode 16 provided at the outermost part of the electrode laminate unit 12. The lithium electrode 16 has a lithium-electrode current collector 26 welded to a negative-electrode current collector 22 and a lithium unit 27 sandwiched between the lithium-electrode current collector 26 and the negative electrode 15. The lithium unit 27 is composed of a lithium holding plate 27a that is in contact with the lithium-electrode current collector 26, and a lithium ion source 27b that is provided to the lithium holding plate 27a. The lithium ion source 27b is not mounted on the lithium-electrode current collector 26, but only the lithium-electrode current collector 26 is laminated and welded, whereby the damage of the lithium ion source 27b is prevented, and the manufacturing operation is simplified.

10 Claims, 10 Drawing Sheets

ELECTRIC STORAGE DEVICE

CROSS-REFERENCE TO RELATED APPLICATIONS

The disclosure of Japanese Patent Application No. 2008-025820 filed on Feb. 6, 2008 including the specification, drawings, and abstract is incorporated herein by reference in its entirety.

BACKGROUND OF THE INVENTION

1. Field of the Invention

The present invention relates to a technology that is well adaptable to an electric storage device having incorporated therein an ion source.

2. Description of the Related Arts

A lithium ion secondary battery or a lithium ion capacitor has been proposed as an electric storage device that is mounted on an electric vehicle, hybrid vehicle, or the like. There has also been proposed an electric storage device in which a metal lithium foil serving as an ion source is incorporated in the electric storage device so as to bring a negative electrode and the metal lithium foil into electrochemical contact with each other in order to enhance an energy density of the electric storage device. By this configuration, lithium ions can be doped into the negative electrode from the metal lithium foil. Therefore, the potential of the negative electrode can be lowered to increase a cell voltage. As a result, the energy density of the electric storage device can be enhanced (see JP-A-2006-286919).

In order to incorporate the metal lithium foil in the electric storage device, it is general that the metal lithium foil is cut into a predetermined shape, and then the resultant is adhered onto a lithium-electrode current collector. However, it is very difficult to cut only a soft thin metal lithium foil. In view of this, there has been proposed a manufacturing method in which a lithium-electrode current collector drawn out from a roll and the metal lithium foil are press bonded so as to be integral with each other, and then the lithium-electrode current collector and the metal lithium foil are both cut, in order to facilitate the cutting operation of the metal lithium foil (e.g., see JP-A-2007-173615).

However, in order to incorporate the metal lithium foil into the electric storage device, not only the operation of adhering the cut metal lithium foil onto the lithium-electrode current collector is needed, but also the operation of welding the lithium-electrode current collector having the metal lithium foil adhered thereon onto the negative-electrode current collector is needed. In the welding operation, the thin soft metal lithium foil might be damaged, which leads to increased cost of the electric storage device. The metal lithium foil is easy to react with water content. Therefore, the operation of welding the lithium-electrode current collector onto the negative-electrode current collector should be done in a dry room or in an argon box. Thus, the welding operation is troublesome, which also leads to the increased cost of the electric storage device.

SUMMARY OF THE INVENTION

An object of the present invention is to achieve a simplified manufacturing operation of an electric storage device provided with an ion source, thereby lowering cost of the electric storage device.

An electric storage device according to the present invention has a positive electrode including a positive-electrode current collector and a positive-electrode mixture layer mounted on the positive-electrode current collector; and a negative electrode including a negative-electrode current collector and a negative-electrode mixture layer mounted on the negative-electrode current collector, and further includes a first conductor connected to the positive-electrode current collector or the negative-electrode current collector; and a second conductor detachably mounted on the first conductor and holding an ion source, wherein the first conductor is first connected to the positive-electrode current collector or the negative-electrode current collector, and the second conductor is then connected to the positive-electrode current collector or the negative-electrode current collector through the first conductor so as to dope ions from the ion source into the positive-electrode mixture layer or the negative-electrode mixture layer.

The electric storage device according to the present invention is characterized in that the second conductor is arranged between the first conductor and the positive-electrode or the negative electrode opposite to the first conductor.

The electric storage device according to the present invention is characterized in that the positive-electrode current collector and the negative-electrode current collector have through-holes formed therethrough.

The electric storage device according to the present invention is characterized in that the ion source is metal lithium.

The electric storage device according to the present invention is characterized in that the first conductor and the second conductor are made of the material of the same type.

The electric storage device according to the present invention is characterized in that the first conductor and the second conductor are made of the material of the same type as that of the positive- or the negative-current collector into which ions are doped.

The electric storage device according to the present invention is characterized in that the first conductor has an indented surface.

The electric storage device according to the present invention is characterized in that the first conductor is rectangular or square.

The electric storage device according to the present invention is characterized in that the potential of the positive electrode when the positive electrode and the negative electrode are short-circuited is 2.0 V or less (vs. Li/Li$^+$).

The electric storage device according to the present invention is characterized in that a negative-electrode active material contained in the negative-electrode mixture layer has a capacitance per the negative-electrode active material weight three times or more larger than the capacitance of a positive-electrode active material per the positive-electrode active material weight contained in the positive-electrode mixture layer, and the positive-electrode active material weight is larger than the negative-electrode active material weight.

The electric storage device according to the present invention has the first conductor connected to the positive-electrode current collector or the negative-electrode current collector, and the second conductor detachably mounted on the first conductor and holding the ion source. The second conductor is connected to the positive-electrode current collector or the negative-electrode current collector through the first conductor, and ions from the ion source are thereby doped into the positive-electrode current collector or the negative-electrode current collector. By this configuration, the welding operation of the lithium-electrode current collector, and the arrangement operation of the ion source can be made separate, and accordingly the ion source incorporated into the electric storage device is easy to be handled, and the manufacturing cost of the electric storage device can be lowered.

DETAILED DESCRIPTION OF THE PREFERRED EMBODIMENTS

Figure 1:
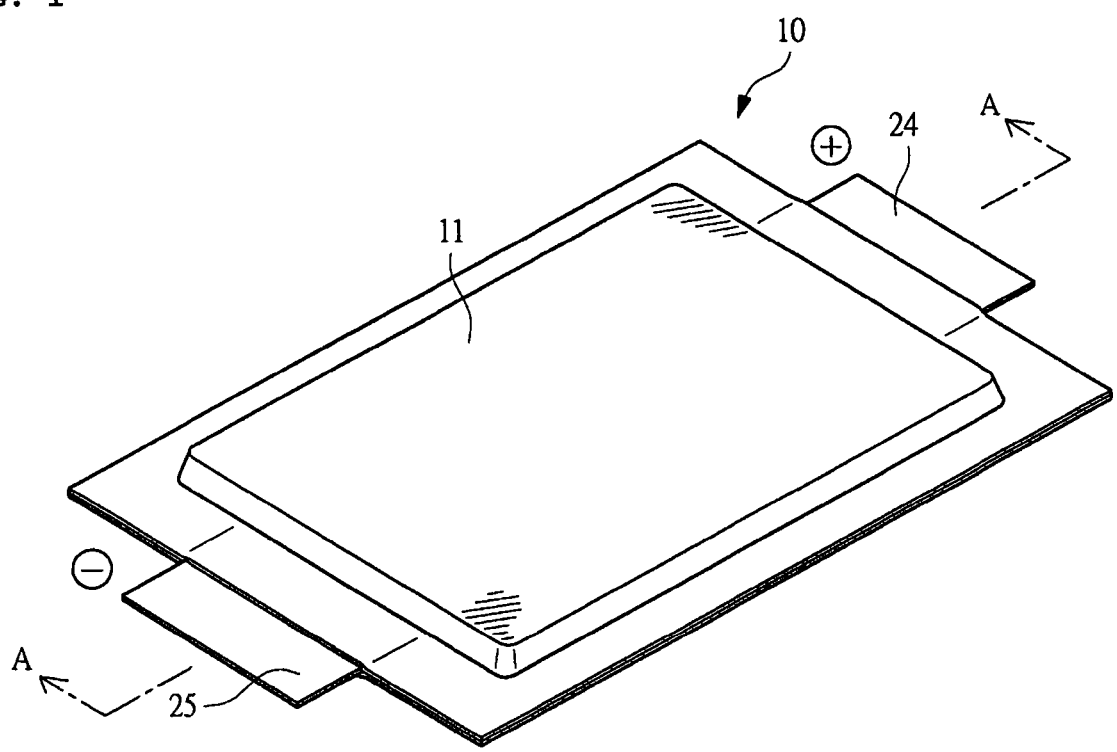
FIG. 1 is a perspective view showing an electric storage device according to one embodiment of the present invention.
Figure 2:
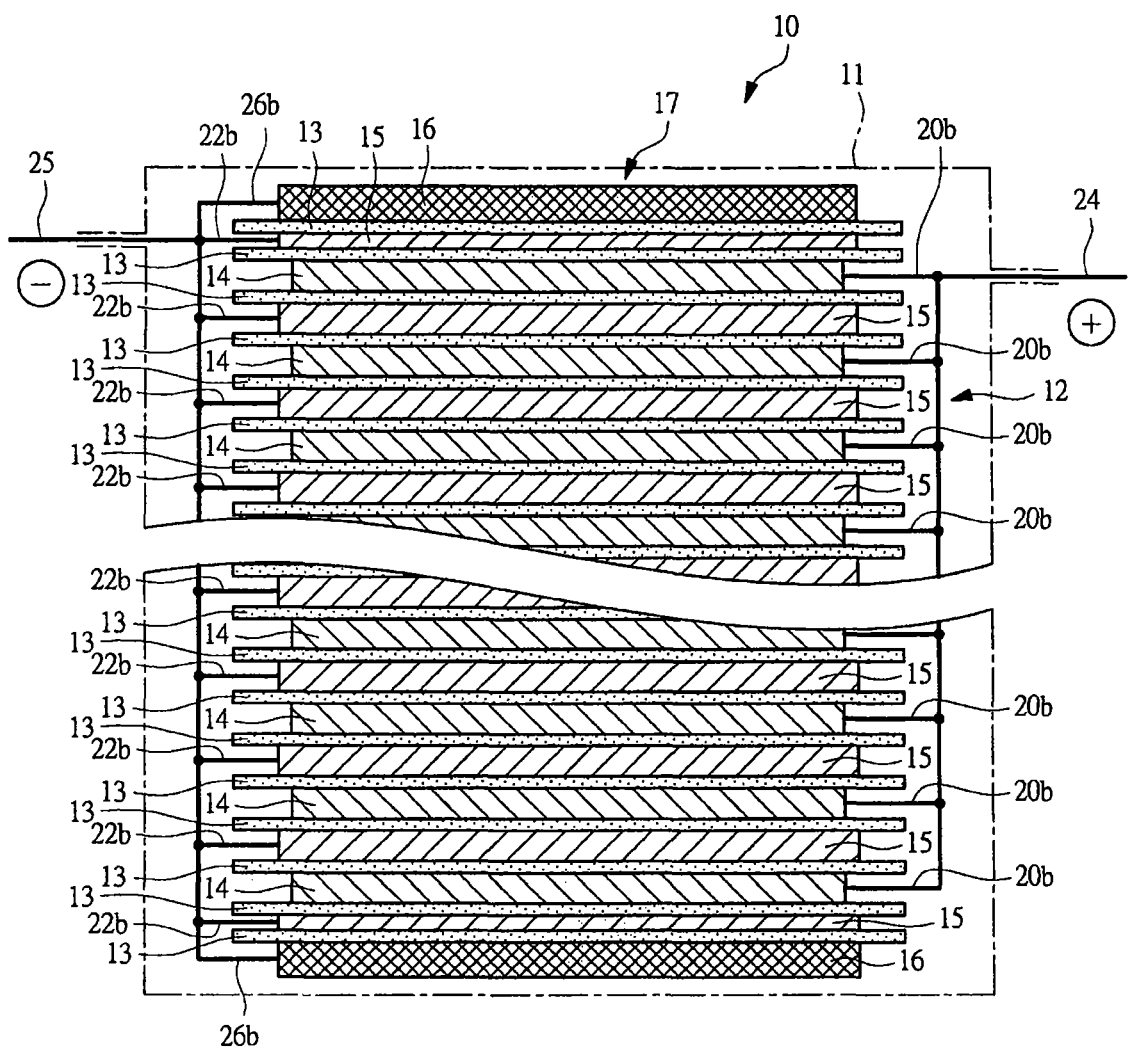
FIG. 2 is a sectional view schematically showing an internal structure of the electric storage device taken along a line A-A in FIG. 1.

FIG. 1 is a perspective view showing an electric storage device 10 according to one embodiment of the present invention. FIG. 2 is a sectional view schematically showing an internal structure of the electric storage device 10 taken along a line A-A in FIG. 1. As shown in FIGS. 1 and 2, an electrode laminate unit 12 is accommodated in a laminate film 11 serving as an outer casing of the electric storage device 10. The electrode laminate unit 12 is composed of positive electrodes 14 and negative electrodes 15 that are laminated through separators 13 alternately. A lithium electrode 16 is arranged at the outermost part of the electrode laminate unit 12 so as to be opposite to the negative electrode 15 through the separator 13. The electrode laminate unit 12 and the lithium electrode 16 constitute a three-electrode laminate unit 17. An electrolyte solution made of aprotic organic solvent containing lithium salt is injected into the laminate film 11.

Figure 3:
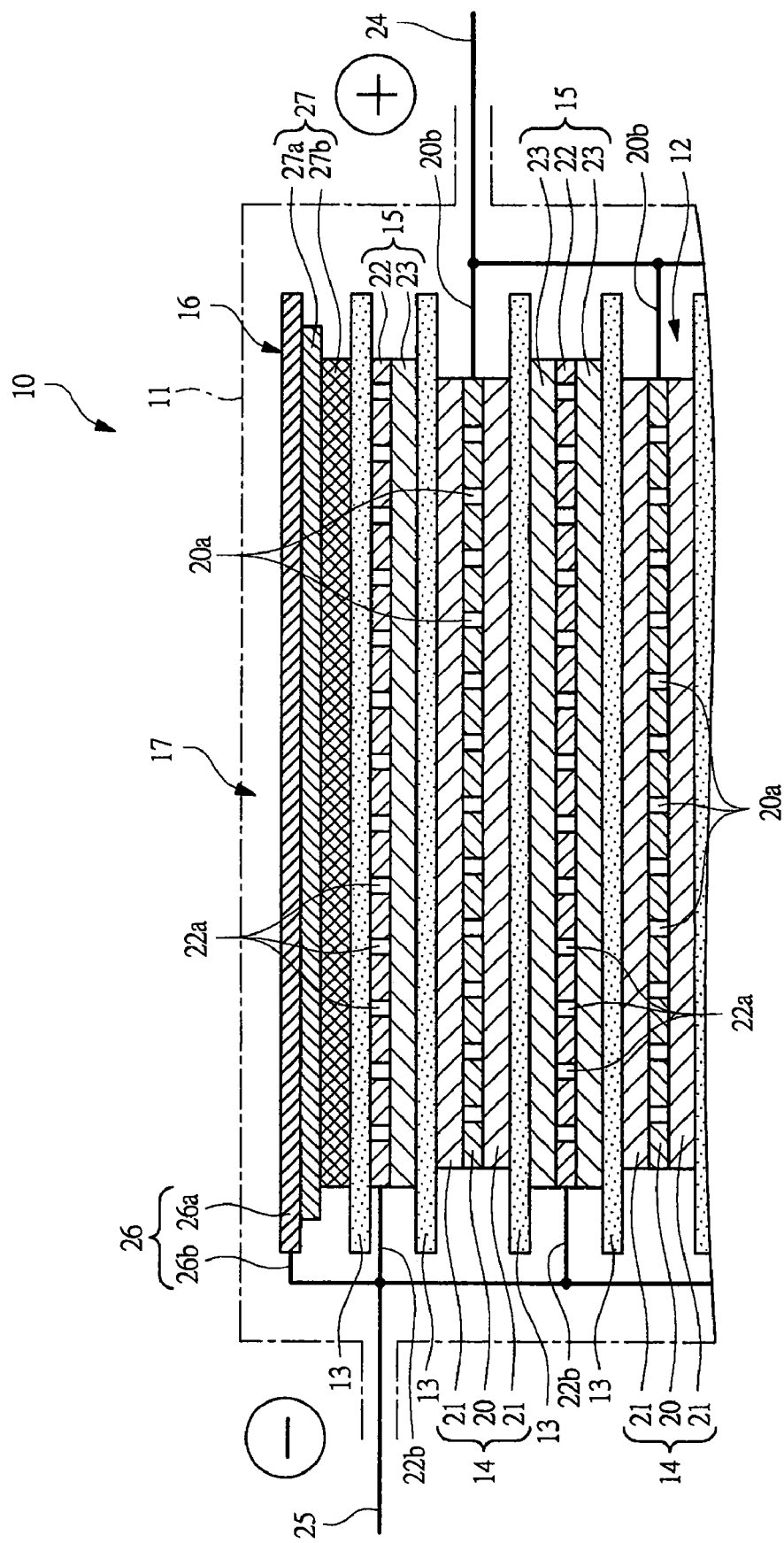
FIG. 3 is a sectional view partially showing the internal structure of the electric storage device as enlarged.

FIG. 3 is a sectional view partially showing the internal structure of the electric storage device 10 as enlarged. As shown in FIG. 3, each of the positive electrodes 14 has a positive-electrode current collector 20 formed with a large number of through-holes 20a and positive-electrode mixture layers 21 coated on the positive-electrode current collector 20. Each of the negative electrodes 15 has a negative-electrode current collector 22 formed with a large number of through-holes 22a and negative-electrode mixture layers 23 coated on the negative-electrode current collector 22. A plurality of positive-electrode current collectors 20 are connected to each other, and connected to a positive electrode terminal 24. The positive electrode terminal 24 projects from the laminate film 11 to the outside. A plurality of negative-electrode current collectors 22 are connected to each other, and connected to a negative electrode terminal 25. The negative electrode terminal 25 projects from the laminate film 11 to the outside. The lithium electrode 16 that is arranged at the outermost part of the electrode laminate unit 12 has a lithium-electrode current collector 26, which is connected to the negative-electrode current collector 22 and serves as a first conductor, and a lithium unit 27 that is in contact with the lithium-electrode current collector 26. The lithium unit 27 is composed of a lithium holding plate 27a that is in contact with the lithium-electrode current collector 26 and serves as a second conductor, and a lithium ion source (ion source) 27b adhered onto the lithium holding plate 27a. A metal lithium foil obtained by thinly extending metal lithium is used as the lithium ion source 27b.

The positive-electrode mixture layer 21 of each of the positive electrodes 14 contains an activated carbon as a positive-electrode active material that allows lithium ions or anions to be reversibly doped thereinto and de-doped therefrom. The negative-electrode mixture layer 23 of each of the negative electrodes 15 contains a polyacene-based organic semiconductor (PAS) as a negative-electrode active material to which lithium ions can be reversibly doped thereinto and de-doped therefrom. The negative electrode 15 and the lithium electrode 16 are electrically connected. By this configuration, lithium ions are doped into the negative electrode 15 from the lithium electrode 16 according to the injection of the electrolyte solution. Thus, the potential of the negative electrode can be lowered, whereby the cell voltage of the electric storage device 10 can be increased. Accordingly, the energy density of the electric storage device 10 can be enhanced. Each of the positive-electrode current collectors 20 and each of the negative-electrode current collectors 22 have a large number of through-holes 20a and 22a. The lithium ions can be moved in the laminating direction through the through-holes 20a and 22a. Thus, the lithium ions can smoothly be doped into all of the laminated negative electrodes 15. In the present invention, the term "doping (dope)" involves "occlude", "carry", "absorb", "insert", or the like and specifically a phenomenon where lithium ions enter the positive-electrode active material or the negative-electrode active material. The term "de-doping (de-dope)" involves "release", "desorb", or the like and specifically a phenomenon where lithium ions or anions desorb from the positive-electrode active material or the negative-electrode active material.

In order to increase the capacity of the electric storage device 10, the amount of doped lithium ions to the negative electrode 15 is set such that the potential of the positive electrode after short-circuiting the positive electrode 14 and the negative electrode 15 becomes 2.0 V or less (vs. $Li/Li^+$). By setting the amount of the doped lithium ions as described above, the area where the potential of the positive electrode becomes 3 V or less can be used, with the result that the capacity of the electric storage device 10 can be increased. Specifically, in a case where a conventional electric double layer capacitor is discharged, the potential of the negative electrode rises to about 3 V when the potential of the positive electrode lowers to about 3 V. Accordingly, the discharge of the conventional electric double layer capacitor ends at the time when the potential of the positive electrode lowers to about 3 V. On the other hand, in the electric storage device 10, the discharge can be continued to the area where the potential of the positive electrode becomes 2 V or less by doping the lithium ions to the negative electrode 15. Notably, the potential changes by the dope or de-dope of the anions to or from the positive electrode 14 at the area where the potential of the positive electrode exceeds 3 V. The potential changes by the dope or de-dope of the lithium ions to or from the positive electrode 14 at the area where the potential of the positive electrode is 3 V or less.

In order to increase the capacity of the electric storage device 10, the capacitance per the negative-electrode active material weight is set to be three times or more larger than the capacitance per the positive-electrode active material weight.

Further, the positive-electrode active material weight is set to be larger than the negative-electrode active material weight. Specifically, the capacitance per the negative-electrode active material weight is set to be larger than the capacitance per the positive-electrode active material weight, whereby the amount of the change in the potential of the negative electrode 15 at the time of charging or discharging the device can be suppressed. Therefore, the amount of the change in the potential of the positive electrode 14 can be increased. In the electric storage device 10, the capacitance per the negative-electrode active material weight is large. Therefore, the positive-electrode active material weight is increased, while the negative-electrode active material weight is decreased. By this configuration, the capacitance and the cell capacity of the electric storage device 10 can be increased, while preventing the electric storage device 10 from increasing in size.

Figure 4:
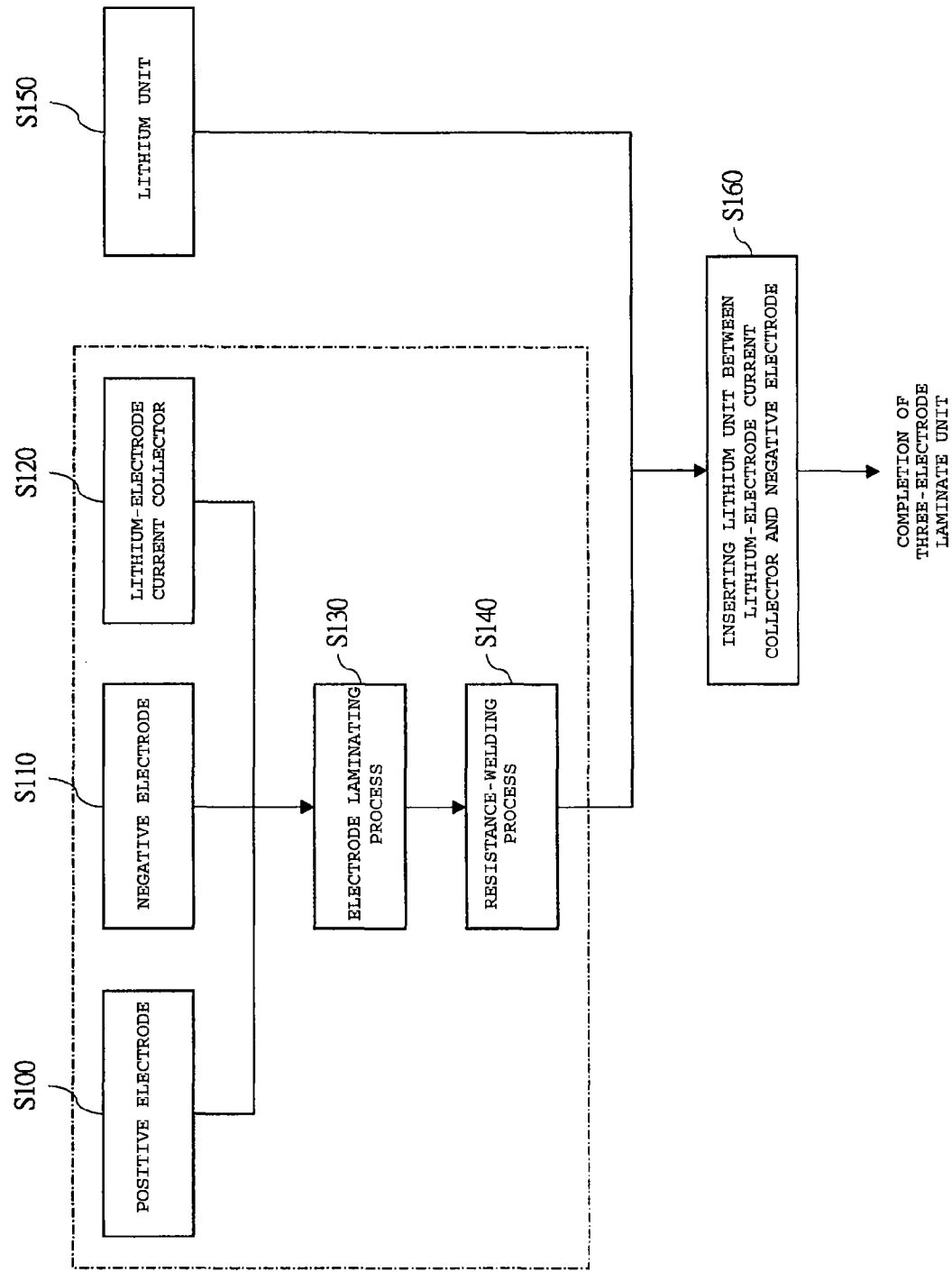
FIG. 4 is a flowchart schematically showing the manufacturing procedure of the electric storage device.
Figure 5:
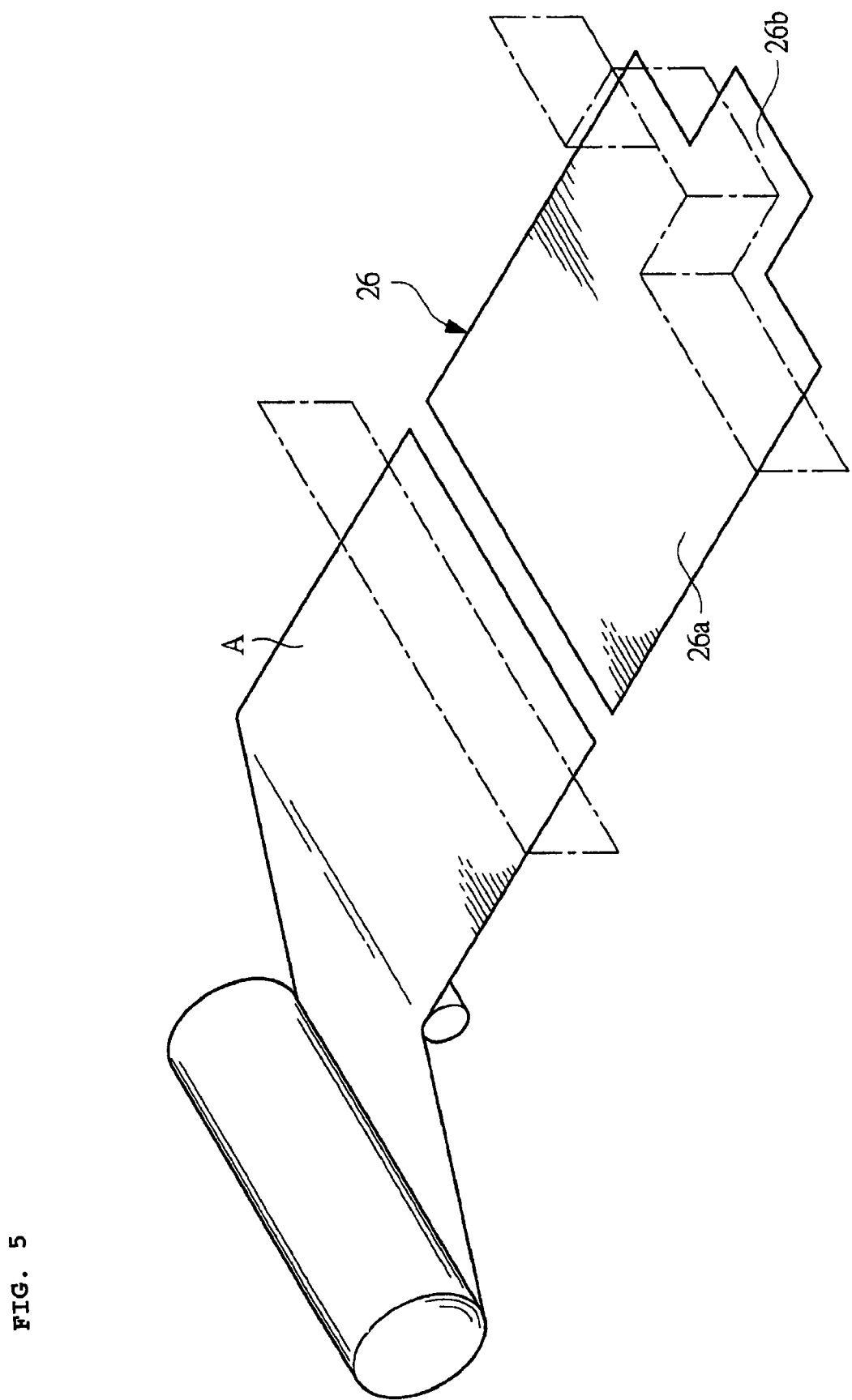
FIG. 5 is a schematic view showing a manufacturing process of a lithium-electrode current collector.

Next, the manufacturing procedure of the electric storage device 10 having the lithium electrode 16 incorporated therein will be described. FIG. 4 is a flowchart schematically showing the manufacturing procedure of the electric storage device 10. As shown in FIG. 4, a slurry for a positive electrode containing an activated carbon or the like is coated on the positive-electrode current collector 20 at step S100. Thus, the positive electrode 14 having the positive-electrode mixture layer 21 formed on the surface of the positive-electrode current collector 20 is prepared. Similarly, a slurry for a negative electrode containing a PAS or the like is coated on the negative-electrode current collector 22 at step S110. Thus, the negative electrode 15 having the negative-electrode mixture layer 23 formed on the surface of the negative-electrode current collector 22 is prepared. At step S120, a copper foil material is cut into a predetermined shape. Therefore, the lithium-electrode current collector 26 constituting the lithium electrode 16 is prepared. FIG. 5 is a schematic view showing the manufacturing procedure of the lithium-electrode current collector 26. As shown in FIG. 5, the lithium-electrode current collector 26 is cut out from the copper foil material A by means of a predetermined cutting device. The lithium-electrode current collector 26 has a convex shape including a rectangular contact portion 26a and a welding portion 26b extending from one end of the contact portion 26a. The lateral width of the welding portion 26b is set to be smaller than the lateral width of the negative electrode terminal 25. The positive-electrode current collector 20 and the negative-electrode current collector 22 are also formed into a convex shape like the lithium-electrode current collector 26.

As shown in FIG. 4, an electrode laminating process is executed at step S130. The positive electrode 14 and the negative electrode 15 are laminated through the separator 13 in such a manner that the welding portion 20b of the positive-electrode current collector 20 and the welding portion 22b of the negative-electrode current collector 22 are set in the opposite side. In this electrode laminating process, the lithium-electrode current collector 26 is laminated through the separator 13 so as to be opposite to the negative electrode 15 that is arranged at the outermost part. Then, at step S140, a resistance-welding process is performed on the welding portions 20b of the positive-electrode current collectors 20 so as to connect a plurality of positive-electrode current collectors 20 to one another. The resistance-welding process is also performed on the welding portions 22b of the negative-electrode current collectors 22 and the welding portion 26b of the lithium-electrode current collector 26 so as to connect a plurality of negative-electrode current collectors 22 and the lithium-electrode current collector 26.

Figure 6:
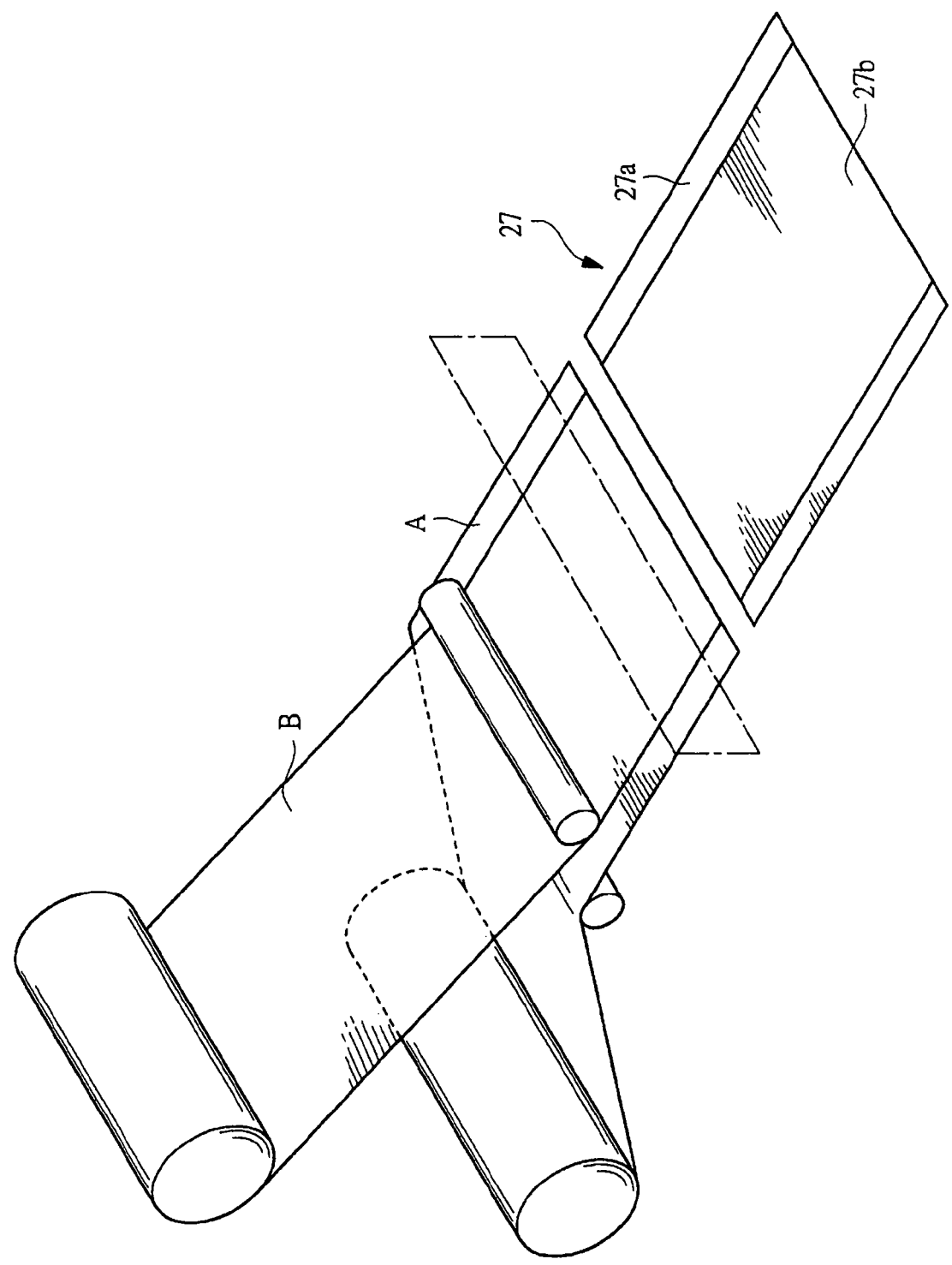
FIG. 6 is a schematic view showing a manufacturing process of a lithium unit.

At step S150, the copper foil material A and a metal lithium foil material B are cut as overlapped with each other. Thus, the lithium unit 27 having the lithium holding plate 27a and the lithium ion source 27b adhered onto the lithium holding plate 27a is prepared. FIG. 6 is a schematic view showing the manufacturing process of the lithium unit 27. As shown in FIG. 6, the metal lithium foil material B for forming the lithium ion source 27b is superimposed on the copper foil material A for forming the lithium holding plate 27a, and the resultant is press-bonded by means of a roll press. The copper foil material A and the metal lithium foil material B, which are press bonded, are together cut into a rectangular shape. By this process, the lithium unit 27 is fabricated. The copper foil material A and the metal lithium foil material B are cut as superimposed with each other as described above, whereby the copper foil material A and the metal lithium foil material B can simultaneously be cut, and further, the soft metal lithium foil material B can easily be cut. Consequently, the processing cost of the lithium unit 27 can be reduced.

Figure 7:
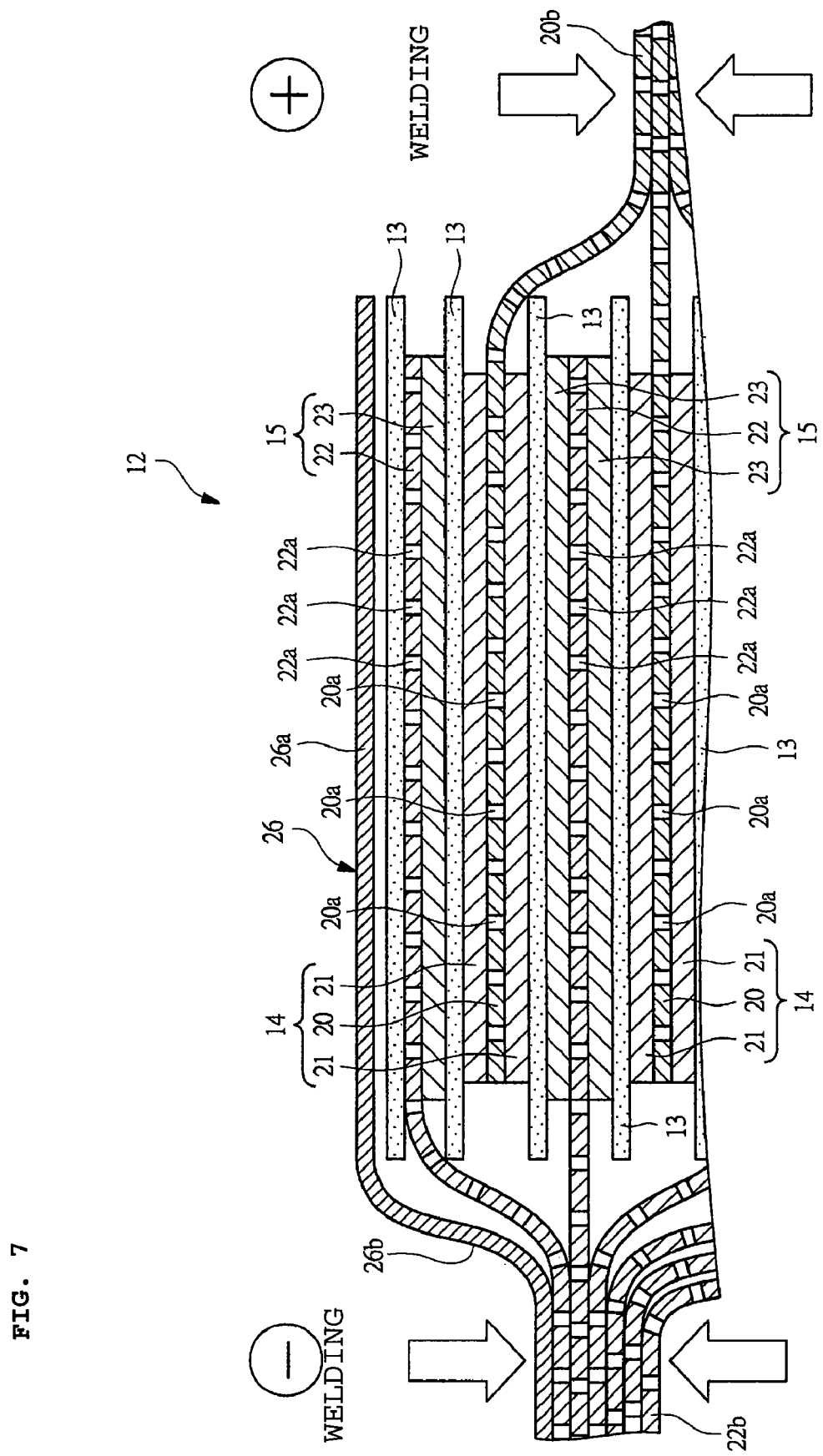
FIG. 7 is an explanatory view showing a procedure for incorporating the lithium unit into an electrode laminate unit.
Figure 8:
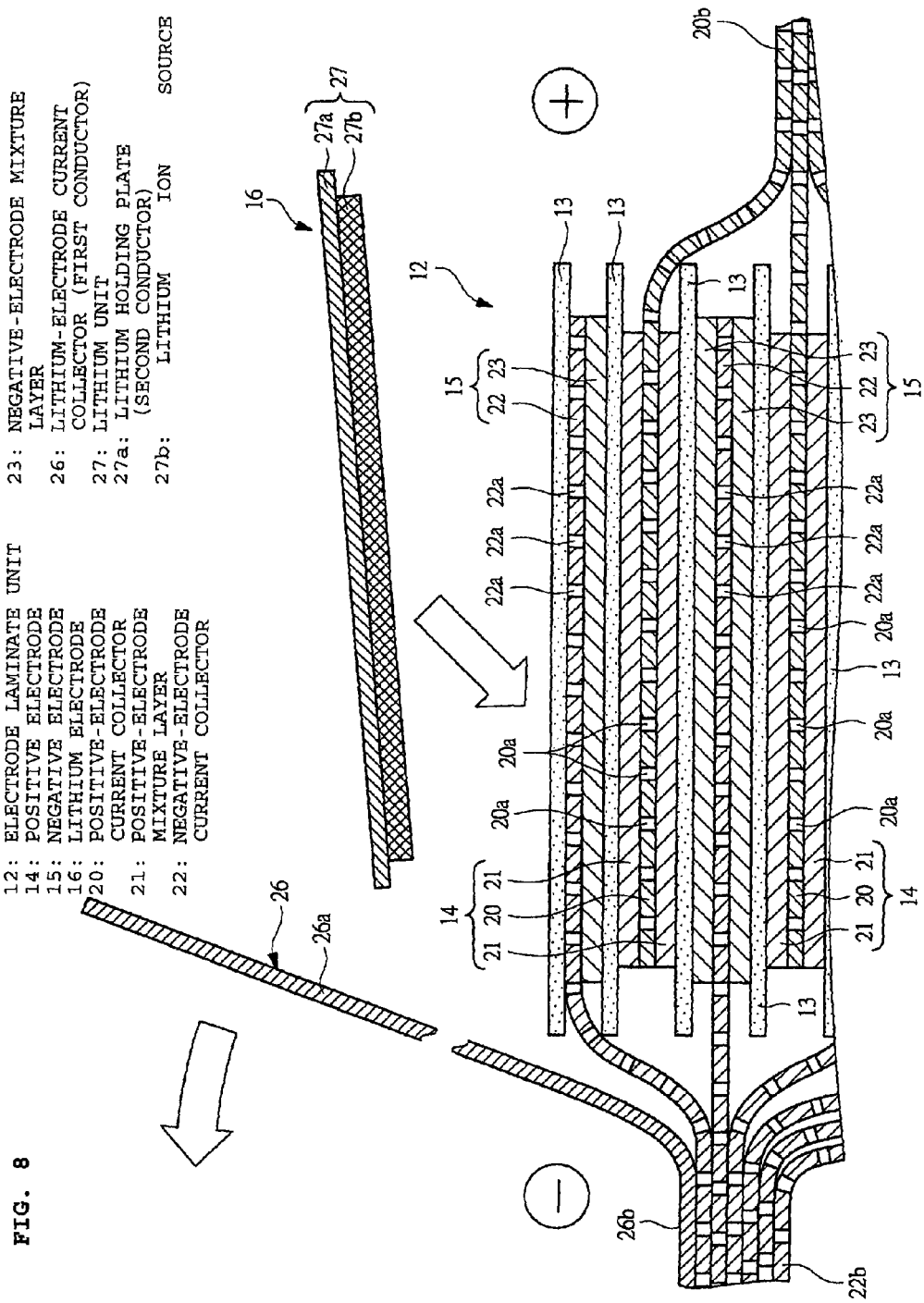
FIG. 8 is an explanatory view showing a procedure for incorporating the lithium unit into the electrode laminate unit.
Figure 9:
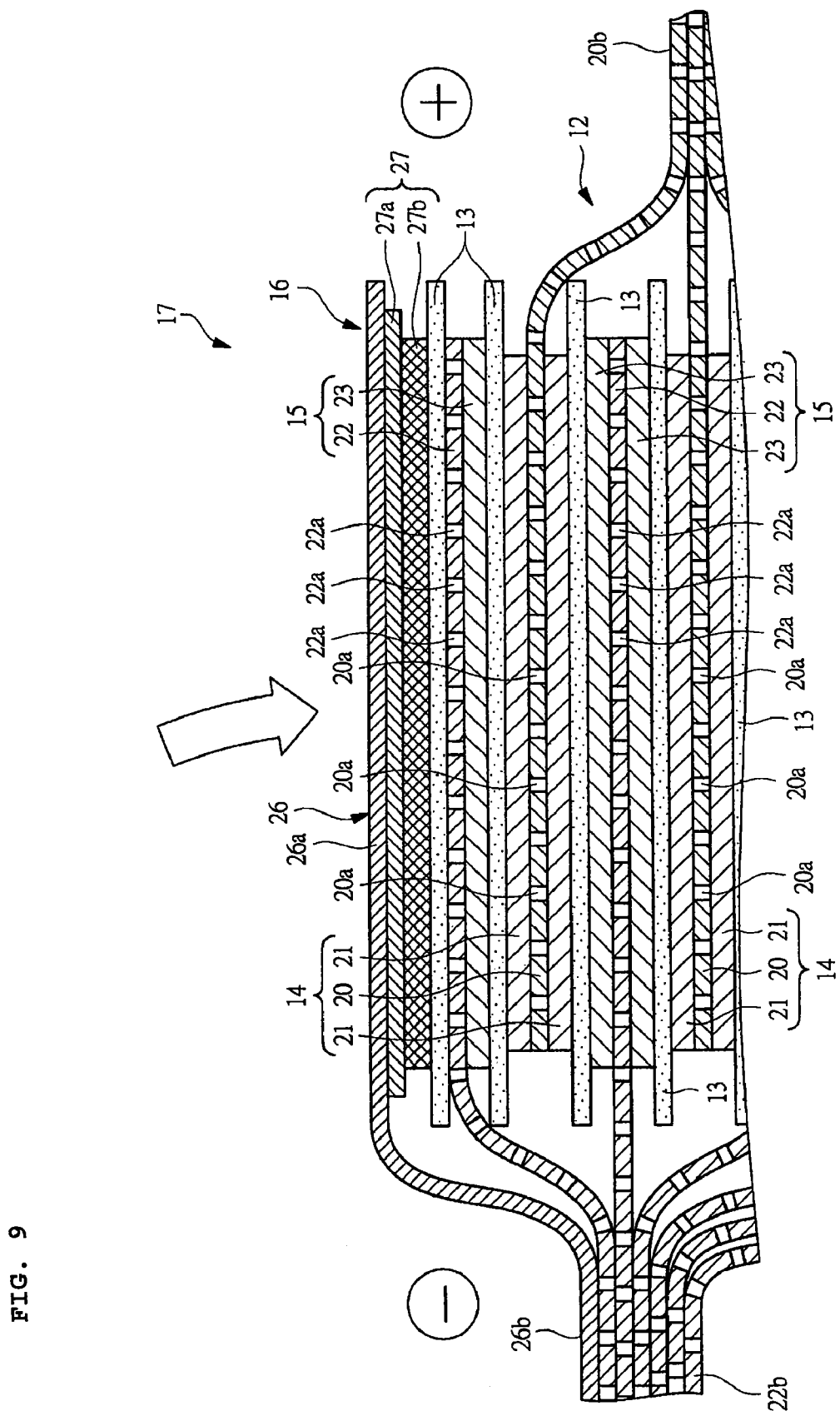
FIG. 9 is an explanatory view showing a procedure for incorporating the lithium unit into the electrode laminate unit.

Then, at step S160, the lithium unit 27 is incorporated into the electrode laminate unit 12. FIGS. 7 and 8 are explanatory views for showing the procedure of incorporating the lithium unit 27 into the electrode laminate unit 12, which show the procedures at step S140 and step S160 in FIG. 4. As shown in FIG. 7, the lithium-electrode current collector 26 is arranged so as to be opposite to the negative electrode 15 arranged at the outermost part of the electrode laminate unit 12. Next, pressure is applied as indicated by an arrow to the welding portions of the negative-electrode current collectors 22 and the welding part of the lithium-electrode current collector 26, which are superimposed with each other, to perform the resistance welding. Then, as shown in FIG. 8, the lithium-electrode current collector 26 having one end welded to the negative-electrode current collector 22 is removed, and the lithium unit 27 is inserted between the negative electrode 15 and the lithium-electrode current collector 26 in such a manner that the lithium-electrode current collector 26 and the lithium holding plate 27a are opposite to each other. Then, as shown in FIG. 9, the lithium-electrode current collector 26, which is removed, is returned to be in contact with the lithium holding plate 27a. By this process, the lithium unit 27 is sandwiched between the lithium-electrode current collector 26 and the negative electrode 15. By inserting the lithium unit 27 as described above, the lithium ion source 27b and the negative electrode 15 are electrically connected through the lithium holding plate 27a and the lithium-electrode current collector 26. Thus, the lithium ions are doped into the negative electrode 15 from the lithium ion source 27b according to the injection of the electrolyte solution.

As described above, the lithium-electrode current collector 26 that is resistance-welded to the negative-electrode current collector 22 and the lithium holding plate 27a that holds the lithium ion source 27b are provided separately. Therefore, the lithium ion source 27b that is incorporated in the electric storage device 10 is easy to handle. Accordingly, the manufacturing cost of the electric storage device 10 can be reduced. Specifically, in a conventional electric storage device, the lithium ion source is adhered to the lithium-electrode current collector, and then the lithium-electrode current collector is resistance-welded as superimposed on the electrode laminate unit. Therefore, a user should handle the lithium-electrode current collector carefully not to damage the lithium ion source. On the other hand, in the electric storage device 10 according to the present invention, the lithium ion source 27b is not adhered to the lithium-electrode current collector 26. Accordingly, the lithium-electrode current collector 26 can easily be handled without considering the damage to the lithium ion source 27b. Further, the electric storage device 10 is configured such that the lithium ion source 27b, which is liable to react with water contents, is inserted afterward. Therefore, the laminating process, welding process, or other process indicated by the one-dot-chain line in FIG. 4 can be executed under normal atmosphere. Consequently, the operation in a dry room or argon box is not needed. Accordingly, the manufacturing cost can further be reduced. Moreover, the damage or deterioration of the lithium ion source 27b is not caused during the manufacturing process. Therefore, the quality of the electric storage device 10 can be stabilized.

Figure 10:
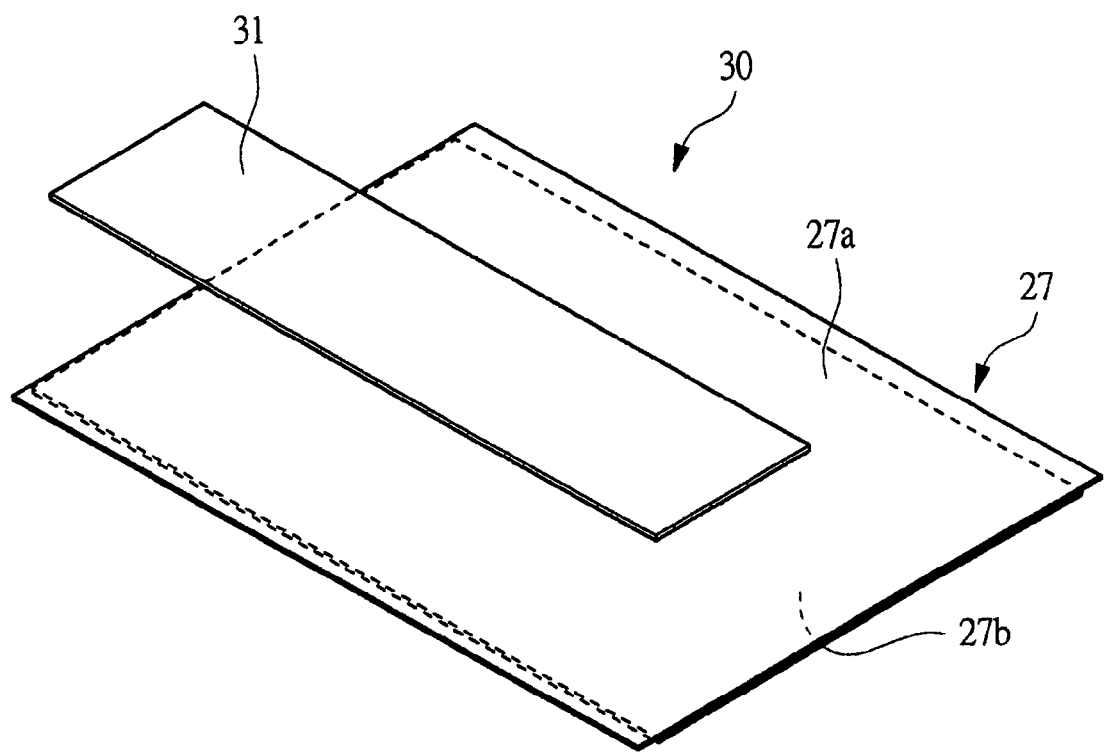
FIG. 10 is a perspective view showing the lithium unit incorporated into an electric storage device according to another embodiment of the present invention.

In the present invention, the lithium-electrode current collector and the lithium holding plate are provided separately. Therefore, the lithium-electrode current collector 26 and the lithium holding plate 27b can be formed into a simple shape such as a rectangular. FIG. 10 is a perspective view showing a lithium unit 30 incorporated in an electric storage device according to another embodiment. The components same as those shown in FIG. 6 are identified by the same numerals, and the explanation thereof are omitted. As shown in FIG. 10, the lithium-electrode current collector 31 can have a shape connectable to the negative-electrode current collector 22. The lithium holding plate 27a can have a shape that can hold the lithium ion source 27b. Therefore, both of them can be cut into a simple shape such as a rectangular or a square. Thus, a complicated cutting device is not needed. In addition, the lithium-electrode current collector 31 or the lithium holding plate 27a can efficiently be cut out from a material. Accordingly, the manufacturing cost of the lithium-electrode current collector 31 and the lithium holding plate 27a can be reduced.

The lithium holding plate 27a is detachably mounted on the lithium-electrode current collector 26. Specifically, the lithium-electrode current collector 26 and the lithium holding plate 27a are only in contact with each other, not fixed to each other. However, since a three-electrode laminate unit 17 is put in the laminate film 11 in a vacuum state, the lithium-electrode current collector 26 and the lithium holding plate 27a are pressed against each other by atmospheric pressure, whereby the energizing state between the lithium-electrode current collector 26 and the lithium holding plate 27a are satisfactorily maintained. Since the lithium-electrode current collector 26 and the lithium holding plate 27a is not welded but only in contact with each other, the manufacturing operation can be simplified.

The components of the aforesaid each of the electric storage devices will be explained in detail in the following order: [A] positive electrode, [B] negative electrode, [C] negative-electrode current collector and positive-electrode current collector, [D] lithium electrode, [E] separator, [F] electrolyte solution, [G] outer casing.

[A] Positive Electrode

The positive electrode has the positive-electrode current collector and the positive-electrode mixture layer coated on the positive-electrode current collector. The positive-electrode mixture layer contains a positive-electrode active material. The positive-electrode active material is not particularly limited, so long as it allows ions to be reversibly doped thereinto and de-doped therefrom. Examples of the positive-electrode active materials include activated carbon, transition metal oxide, conductive polymer, and polyacene-based substance.

For example, the activated carbon is made of an activated carbon grain that is subject to an alkali activation treatment and has a specific surface area of not less than 600 $m^2/g$. A phenolic resin, petroleum pitch, petroleum coke, coconut husk, coal-derived coke, and the like are used as the material of the activated carbon, wherein it is preferable to use the phenolic resin or coal-derived coke, since they can increase the specific surface area. Preferable alkali activators used for the alkali activation treatment of the activated carbons include salts or hydroxides of a metal ion such as lithium, sodium, and potassium, wherein potassium hydroxide is more preferable. Examples of the methods of the alkali activation include the method in which a carbide and an activator are mixed, and then the resultant is heated in an airflow of inert gas, the method in which an activator is carried on a raw material of an activated carbon beforehand, the resultant is heated, and then a carbonizing process and activating process are performed, the method in which a carbide is activated with a gas activation by using water vapors, and then the resultant is surface-treated with an alkali activator. The activated carbon to which the alkali activation treatment is performed is pulverized by means of a known pulverizer such as a ball mill or the like. The grain size within a generally used wide range can be applied. For example, it is preferable that $D_{50}$ is 2 µm or more, more preferably 2 to 50 µm, and most preferably 2 to 20 µm. Further, the activated carbon preferably having an average pore diameter of 10 nm or less and a specific surface area of 600 to 3000 $m^2/g$ is preferable. More preferably, an activated carbon having a specific surface area of 800 $m^2/g$ or more, particularly 1300 to 2500 $m^2/g$ is preferable.

A vanadium pentoxide ($V_2O_5$) or a lithium cobalt oxide ($LiCoO_2$) can be contained as the positive-electrode active material in order to increase the capacity of the positive-electrode mixture layer. Examples of the other materials include a lithium-containing metal oxide represented by a chemical formula of $Li_xM_yO_z$ (x, y, z are positive numbers, M is a metal, or can be metals of two or more types), such as $Li_xCoO_2$, $Li_xNiO_2$, $Li_xMnO_2$, and $Li_xFeO_2$, or an oxide or an sulfide of a transition metal such as cobalt, manganese, vanadium, titanium, and nickel. In a case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt-nickel compound oxide.

The positive-electrode active material described above such as the lithium cobalt oxide or activated carbon is formed into a powdery shape, granular shape, short fibrous shape, or the like, and this positive-electrode active material is mixed with a binder to form a slurry. The slurry containing the positive-electrode active material is coated on the positive-electrode current collector and the resultant is dried, whereby the positive-electrode mixture layer is formed on the positive-electrode current collector. Usable binders to be mixed with the positive-electrode active material include rubber binder such as SBR, fluorine-containing resin such as polytetrafluoroethylene, and polyvinylidene fluoride, thermoplastic resin such as polypropylene, polyethylene, and polyacrylate. A conductive material such as acetylene black, graphite, and metal powder can appropriately be added to the positive-electrode mixture layer.

[B] Negative Electrode

The negative electrode has the negative-electrode current collector and the negative-electrode mixture layer coated on the negative-electrode current collector. The negative-electrode mixture layer contains a negative-electrode active material. The negative-electrode active material is not particularly limited, so long as it allows ions to be reversibly doped thereinto and de-doped therefrom. Examples of the negative-electrode active material include graphite, various carbon materials such as hard carbon (non-graphitizable carbon) and polyacene-based material, tin oxide, and silicon oxide. The graphite and hard carbon material are preferable as the negative-electrode active material, since they can increase the capacity. Further, a polyacene-based organic semiconductor (PAS) that is a heat-treated material of an aromatic condensation polymer is preferable for a negative-electrode active material, since it can increase the capacity. The PAS has a polyacene skeletal structure. The ratio (H/C) of a number of hydrogen atoms to a number of carbon atoms is preferably within the range of not less than 0.05 and not more than 0.50. When the H/C of the PAS exceeds 0.50, the aromatic polycyclic structure is not sufficiently grown, so that the lithium ions cannot smoothly be doped or de-doped. Therefore, the charging/discharging efficiency of the electric storage device 10 might be reduced. When the H/C of the PAS is less than 0.05, the capacity of the electric storage device might be reduced.

The aforesaid negative-electrode active material such as PAS is formed into a powdery shape, a granular shape or short fibrous shape. This negative-electrode active material is mixed with a binder to form a slurry. The slurry containing the negative-electrode active material is coated on the negative-electrode current collector and the resultant is dried, whereby the negative-electrode mixture layer is formed on the negative-electrode current collector. Usable binders to be mixed with the negative-electrode active material include fluorine-containing resin such as polytetrafluoroethylene, and polyvinylidene fluoride, thermoplastic resin such as polypropylene, polyethylene, and polyacrylate, and a rubber binder such as styrene butadiene rubber (SBR). The fluorine-based binder is preferably used. Examples of the fluorine-based binder include polyvinylidene fluoride, copolymer of vinylidene fluoride and trifluoroethylene, copolymer of ethylene and tetrafluoroethylene, and copolymer of propylene and tetrafluoroethylene. A conductive material such as acetylene black, graphite, and metal powder can appropriately be added to the negative-electrode mixture layer.

[C] Positive-Electrode Current Collector and Negative-Electrode Current Collector The positive-electrode current collector and the negative-electrode current collector preferably have through holes penetrating therethrough. Examples of the current collector include an expanded metal, punching metal, etching foil, net, and expanded member. The shape and number of the through hole are not particularly limited, and they are appropriately set so long as they do not hinder the movement of the anions or lithium ions. Various materials generally proposed for a battery or a capacitor can be employed as the material of the negative-electrode current collector and the positive-electrode current collector. For example, aluminum, stainless steel or the like can be used as the material of the positive-electrode current collector. Stainless steel, copper, nickel, or the like can be used as the material of the negative-electrode current collector.

[D] Lithium Electrode

Various materials generally proposed as a current collector of a battery or a capacitor can be used as the material of the lithium-electrode current collector or the lithium holding plate. Examples of these materials include a stainless steel, copper, nickel, or the like. It is preferable that the lithium-electrode current collector and the lithium holding plate, which are used in contact with each other, are made of materials of the same type in order not to produce a potential difference. It is also preferable that the lithium-electrode current collector and the lithium holding plate are made of the material same as the material of the current collector which the lithium-electrode connects, namely the negative-electrode current collector or the positive-electrode current collector. The lithium-electrode current collector or the lithium holding plate can have through-holes penetrating therethrough, such as an expanded metal, punching metal, etching foil, net, and expanded member. When a material having an indented surface such as an expanded metal is used as the lithium-electrode current collector, for example, the connecting state (energizing state) can be kept to be satisfactory, since the contacting indented surface is easy to cut into the lithium holding plate. A material of the lithium ion source adhered onto the lithium holding plate can be any one that can emit lithium ions. Usable materials include metal lithium, lithium-aluminum alloy, and the like.

[E] Separator

A porous member or the like having durability with respect to the electrolyte solution, positive-electrode active material, negative-electrode active material, or the like, having an open cell and having no electron conductivity can be used for the separator. Generally, a cloth, nonwoven fabric, or porous body made of paper (cellulose), glass fiber, polyethylene, polypropylene, or the like is used. It is preferable that the separator is thin in order to reduce the internal resistance of the cell. The thickness of the separator can appropriately be set considering the holding amount of the electrolyte solution, strength of the separator, or the like.

[F] Electrolyte Solution

It is preferable that an aprotic organic solvent containing a lithium salt is used for the electrolyte solution from the viewpoint that an electrolysis is not produced even by a high voltage and lithium ions can stably be present. Examples of the aprotic organic solvent include ethylene carbonate, propylene carbonate, dimethyl carbonate, diethyl carbonate, γ-butyloractone, acetonitrile, dimethoxyethane, tetrahydrofuran, dioxolane, methylene chloride, and sulfolane, wherein these material are used singly or mixed with one another. Examples of the lithium salt include $LiClO_4$, $LiAsF_6$, $LiBF_4$, $LiPF_6$, and $LiN(C_2F_5SO_2)_2$. Further, the concentration of the electrolyte in the electrolyte solution is preferably set to at least 0.1 mol/L or more, and more preferably set within the range of 0.5 to 1.5 mol/L, in order to reduce the internal resistance due to the electrolyte solution.

[G] Outer Casing

Various materials generally used for a battery can be used for the outer casing. A metal material such as iron or aluminum can be used, and a film material or the like made of resin can be used. The shape of the outer casing is not particularly limited. The outer casing can be formed into a shape appropriately selected according to the purpose, such as a cylindrical shape or rectangular shape. From the viewpoint of miniaturization or reduced weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used.

The present invention is not limited to the aforesaid embodiments, and various modifications are possible without departing from the scope of the present invention. For example, the lithium ions are doped into the negative electrode in the aforesaid description. However, the invention is not limited thereto. The lithium ions can be doped into the positive electrode by welding the lithium-electrode current collector to the positive-electrode current collector. Further, the lithium-electrode current collector welded to the negative-electrode current collector and the lithium-electrode current collector welded to the positive-electrode current collector can be provided so as to dope the lithium ions into both of the positive electrode and the negative electrode. In the illustrated case, the present invention is applied to a laminate-type electric storage device, but the invention is not limited thereto. The present invention can be applied to a wound-type electric storage device.

What is claimed is:

1. An electric storage device comprising:
a positive electrode including a positive-electrode current collector and a positive-electrode mixture layer mounted on the positive-electrode current collector; and
a negative electrode including a negative-electrode current collector and a negative-electrode mixture layer mounted on the negative-electrode current collector,
the electric storage device further including:
a first conductor connected to the positive-electrode current collector or the negative-electrode current collector; and
a second conductor detachably mounted on the first conductor and holding an ion source adhered thereon, wherein
the first conductor is first connected to the positive-electrode current collector or the negative-electrode current collector, and the second conductor is then connected to the positive-electrode current collector or the negative-electrode current collector through the first conductor so as to dope ions from the ion source into the positive-electrode mixture layer or the negative-electrode mixture layer.

2. An electric storage device according to claim 1, wherein the second conductor is arranged between the first conductor and the positive-electrode or the negative electrode opposite to the first conductor.

3. An electric storage device according to claim 1, wherein the positive-electrode current collector and the negative-electrode current collector have through-holes formed therethrough.

4. An electric storage device according to claim 1, wherein the ion source is metal lithium.

5. An electric storage device according to claim 1, wherein the first conductor and the second conductor are made of the same material.

6. An electric storage device according to claim 1, wherein the first conductor and the second conductor are made of the same material as that of the positive-electrode current collector or the negative-electrode current collector into which the ions are doped.

7. An electric storage device according to claim 1, wherein the first conductor has an indented surface.

8. An electric storage device according to claim 1, wherein the first conductor is rectangular or square.

9. An electric storage device according to claim 1, wherein a potential of the positive electrode when the positive electrode and the negative electrode are short-circuited is 2.0 V or less (vs. $Li/Li^+$).

10. An electric storage device according to claim 1, wherein
a negative-electrode active material contained in the negative-electrode mixture layer has a capacitance per a negative-electrode active material weight three times or more larger than a capacitance of a positive-electrode active material per a positive-electrode active material weight contained in the positive-electrode mixture layer, and the positive-electrode active material weight is larger than the negative-electrode active material weight.

* * * * *